United States Patent
Bhat et al.

(10) Patent No.: US 11,763,405 B2
(45) Date of Patent: Sep. 19, 2023

(54) CROSS CONTAMINATION IN PRODUCT DETECTION AND REMEDIATION TECHNIQUES

(71) Applicant: INTERNATIONAL BUSINESS MACHINES CORPORATION, Armonk, NY (US)

(72) Inventors: Ramprasad Bhat, Bangalore (IN); Venkata Vara Prasad Karri, Visakhapatnam (IN); Sarbajit K. Rakshit, Kolkata (IN); Amit Kumar Senapaty, Visakhapatnam (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 164 days.

(21) Appl. No.: 17/249,259

(22) Filed: Feb. 25, 2021

(65) Prior Publication Data
US 2022/0270194 A1 Aug. 25, 2022

(51) Int. Cl.
*G06Q 50/26* (2012.01)
*G06Q 10/10* (2023.01)
(Continued)

(52) U.S. Cl.
CPC ....... *G06Q 50/265* (2013.01); *G06F 16/5866* (2019.01); *G06Q 10/087* (2013.01); *G06Q 10/10* (2013.01)

(58) Field of Classification Search
None
See application file for complete search history.

(56) References Cited

U.S. PATENT DOCUMENTS 10,448,211 B1 * 10/2019 Shen ................. G06K 7/10366
10,984,493 B1 * 4/2021 Borchardt ............ G06Q 50/165
(Continued)

FOREIGN PATENT DOCUMENTS

CN 110081664 A 8/2019
WO 2018023282 A1 2/2018

OTHER PUBLICATIONS

Canadian Institute of Food Safety, "Preventing Cross-Contamination in the Refrigerator," Foodsafety.ca, Sep. 30, 2019 [accessed on Jan. 12, 2021], 7 pages, Retrieved from the Internet: <URL: https://www.foodsafety.ca/blog/preventing-cross-contamination-refrigerator>.

(Continued)

*Primary Examiner* — Fateh M Obaid
(74) *Attorney, Agent, or Firm* — Elliot J. Shine

(57) ABSTRACT

A method, computer system, and a computer program product for product safety is provided. The present invention may include mapping one or more products within a smart container by identifying each of the one or more products and determining a location for each of the one or more products. The present invention may include determining a safety level for each of the one or more products. The present invention may include determining a recommended location to store a new product within the smart container based on a safety confidence score, wherein the safety confidence score is determined based on at least the safety score of the one or more products within the smart container, the safety score of the new product, and a machine learning model. The present invention may include displaying the recommended location to a user.

19 Claims, 5 Drawing Sheets

(51) Int. Cl.
*G06F 16/58* (2019.01)
*G06Q 10/087* (2023.01)

(56) References Cited

U.S. PATENT DOCUMENTS

| | | | | |
|---|---|---|---|---|
| 11,232,395 | B1* | 1/2022 | Crandall | G06Q 10/087 |
| 11,694,786 | B1* | 7/2023 | Van Wilt | G16H 20/60 600/27 |
| 2013/0131968 | A1* | 5/2013 | Wills | G08G 9/00 705/7.12 |
| 2014/0222522 | A1* | 8/2014 | Chait | G06Q 10/0637 705/7.36 |
| 2015/0025917 | A1* | 1/2015 | Stempora | G02B 27/0093 705/4 |
| 2015/0262116 | A1* | 9/2015 | Katircioglu | G06V 20/52 705/28 |
| 2016/0358508 | A1* | 12/2016 | Cheatham, III | G06V 40/172 |
| 2019/0354923 | A1* | 11/2019 | Taira | G06V 10/768 |
| 2022/0051183 | A1* | 2/2022 | Franzo | G06N 20/00 |
| 2022/0147953 | A1* | 5/2022 | Audino | B65F 1/10 |

OTHER PUBLICATIONS

Disclosed Anonymously, "Active Refrigerator," IP.com, Sep. 7, 2018, 22 pages, IP.com No. IPCOM000255186D.
Floarea, et al., "Smart refrigerator: A next generation refrigerator connected to the IoT," 2016 8th International Conference on Electronics, Computers and Artificial Intelligence (ECAI), Jun. 30-Jul. 2, 2016 [accessed on Jan. 12, 2021], 6 pages, IEEE, Ploiesti, RO, DOI: 10.1109/ECAI.2016.7861170, Retrieved from the Internet: <URL: https://ieeexplore.ieee.org/abstract/document/7861170?reload=true>.
FQ&S Staff, "Laser Tests Freshness of Packaged Food," Food Quality & Safety, Nov. 14, 2011 [accessed on Jan. 12, 2021], 8 pages, Retrieved from the Internet: <URL: https://www.foodqualityandsafety.com/article/laser-tests-freshness-of-packaged-food/>.
Hossain, et al., "Smart Refrigerator Based on Internet of Things (IoT): An Approach to Efficient Food Management," ICSDE'18: Proceedings of the 2nd International Conference on Smart Digital Environment, Oct. 2018, pp. 15-18, Retrieved from the Internet: <URL: https://dl.acm.org/doi/10.1145/3289100.3289103>.
Johnston, "Microfluidics panel could add physical buttons to a touch screen," Jan. 23, 2014 [accessed on Jan. 12, 2021], 4 pages, Retrieved from the Internet: <URL: https://arstechnica.com/gadgets/2014/01/new-microfluidics-panel-could-add-physical-buttons-to-a-touch-screen/>.
Kaushal, et al., "IoT Based Smart Food Monitoring System," Technical Research Organisation India, 2019 [accessed on Jan. 12, 2021], pp. 73-76, vol. 6, Issue 6, ISSN (Print): 2393-8374, (Online): 2394-0697, DOI: 10.21276/ijcesr.2019.6.6.14, Retrieved from the Internet: <URL: http://troindia.in/journal/ijcesr/vol6iss6/73-76.pdf>.
Khan, "Cloud-based Architecture of a Smart Expiry System with IoT Device," International Journal of Advance Engineering and Research Development (IJAERD), Apr. 2018 [accessed on Jan. 12, 2021], 11 pages, vol. 5, Issue 4, Scientific Journal of Impact Factor (SJIF), Retrieved form the Internet: <URL: https://www.researchgate.net/publication/324546385_Cloud-based_Architecture_of_a_Smart_Expiry_System_with_IoT_Device>.
Lumen, "The Nature of Light," Boundless Chemistry, Datasheet [online], [accessed on Jan. 12, 2021], 23 pages, Retrieved from the Internet: <URL: https://courses.lumenlearning.com/boundless-chemistry/chapter/the-nature-of-light/>.
Luo, et al., "A smart fridge with an ability to enhance health and enable better nutrition," International Journal of Multimedia and Ubiquitous Engineering, May 2009, 13 pages, vol. 4, No. 2, Retrieved from the Internet: <URL: https://www.researchgate.net/publication/228359020_A_smart_fridge_with_an_ability_to_enhance_health_and_enable_better_nutrition>.
Mell, et al., "The NIST Definition of Cloud Computing", National Institute of Standards and Technology, Special Publication 800-145, Sep. 2011, 7 pages.
N G, et al., "IoT Based Interactive Smart Refrigerator," 3rd International Conference on Computers and Management (ICCM 2017), Dec. 2017 [accessed on Jan. 12, 2021], 8 pages, ResearchGate, Jaipur, IN, Retrieved from the Internet: <URL: https://www.researchgate.net/publication/322653199_IoT_Based_Interactive_Smart_Refrigerator>.
Popa, et al., "An Intelligent IoT-Based Food Quality Monitoring Approach Using Low-Cost Sensors," Symmetry, 2019 [accessed on Jan. 12, 2021], 18 pages, vol. 11, No. 374, DOI: 10.3390/sym11030374, Retrieved from the Internet: <URL: https://www.mdpi.com/2073-8994/11/3/374>.
Press Release, "Samsung Launches Next-Generation IoT-Enabled Refrigerator Family Hub," Digit, Jul. 18, 2018 [accessed on Jan. 12, 2021], 9 pages, Retrieved from the Internet: <URL: https://www.digit.in/press-release/refrigerators/samsung-launches-next-generation-iot-enabled-refrigerator-family-hub-42293.html>.

\* cited by examiner

CROSS CONTAMINATION IN PRODUCT DETECTION AND REMEDIATION TECHNIQUES

BACKGROUND

The present invention relates generally to the field of computing, and more particularly to IoT enabled systems.

Detecting potential cross-contamination between products may be an important aspect of product safety. Cross-contamination may be the process by which a product becomes contaminated with harmful substances or agents. Cross-contamination may occur between various products during storage. Where a product is stored, the container a product is stored in, and/or the products surrounding the product, all impact the possibility of cross-contamination.

Determining the best location for a food product and monitoring the surrounding food products may be important aspects in preventing cross-contamination.

SUMMARY

Embodiments of the present invention disclose a method, computer system, and a computer program product for product safety. The present invention may include mapping one or more products within a smart container by identifying each of the one or more products and determining a location for each of the one or more products. The present invention may include determining a safety level for each of the one or more products. The present invention may include determining a recommended location to store a new product within the smart container based on a safety confidence score, wherein the safety confidence score is determined based on at least the safety score of the one or more products within the smart container, the safety score of the new product, and a machine learning model. The present invention may include displaying the recommended location to a user.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
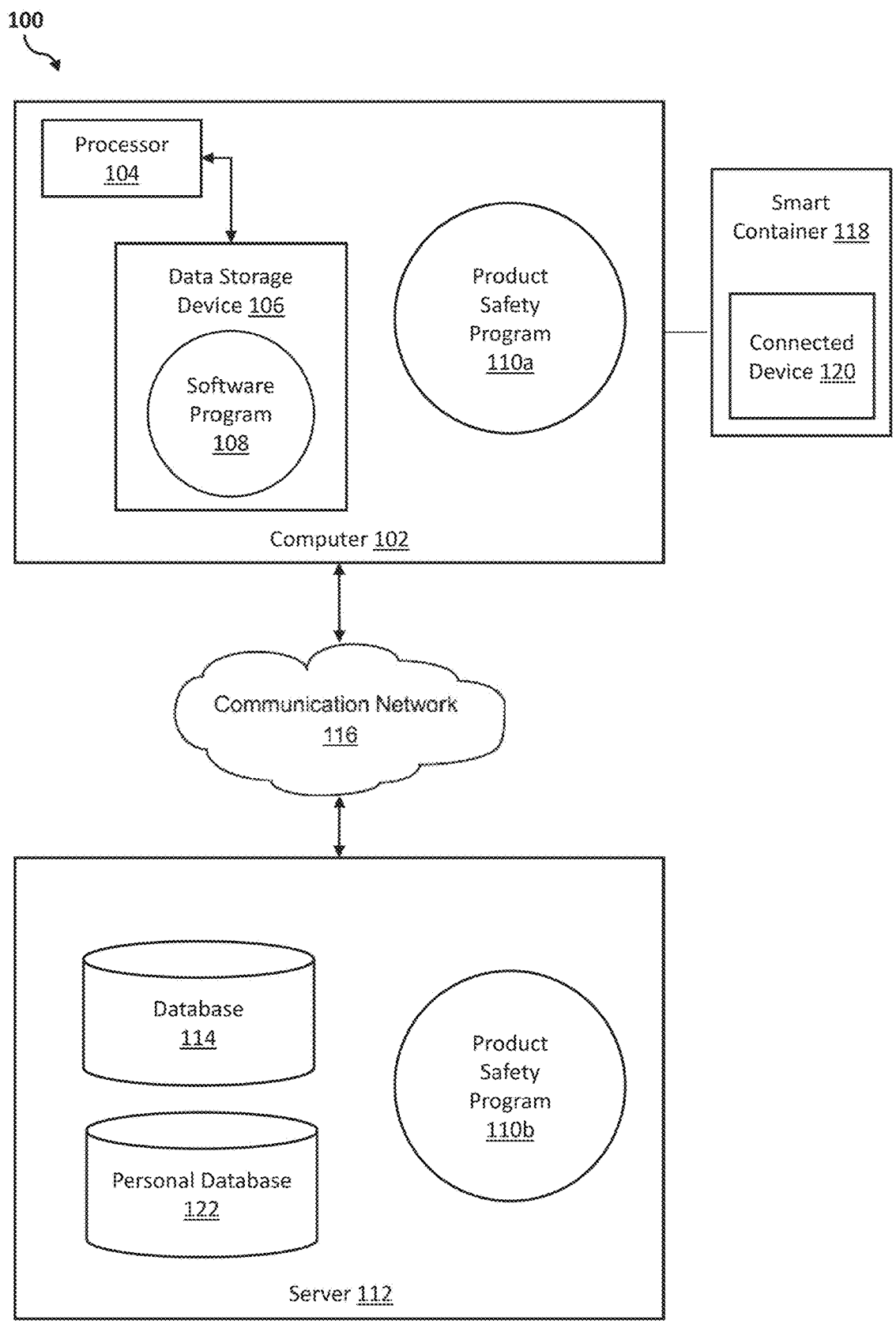
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for product safety. As such, the present embodiment has the capacity to improve the technical field of IoT enabled systems by displaying a recommended location to store a new product within a smart container to use user to reduce the possibility of cross-contamination. More specifically, the present invention may include mapping one or more products within a smart container by identifying each of the one or more products and determining a location for each of the one or more products. The present invention may include determining a safety level for each of the one or more products. The present invention may include determining a recommended location to store a new product within the smart container based on a safety confidence score, wherein the safety confidence score is determined based on at least the safety score of the one or more products within the smart container, the safety score of the new product, and a machine learning model. The present invention may include displaying the recommended location to a user.

As described previously, detecting potential cross-contamination between products may be an important aspect of product safety. Cross-contamination may be the process by which a product becomes contaminated with harmful substances or agents. Cross-contamination may occur between various products during storage. Where a product is stored, the container a product is stored in, and/or the products surrounding the product, all impact the possibility of cross-contamination.

Determining the best location for a food product and monitoring the surrounding food products may be important aspects in preventing cross-contamination.

Therefore, it may be advantageous to, among other things, map one or more products within a smart container, determine a safety level for each of the one or more products, determine a recommended location to store a new product within the smart container, and display the recommended location to a user.

According to at least one embodiment, the present invention may improve product safety by determining a recommended location to store a new product within a smart container based on a safety confidence score, wherein the safety confidence score is determined based on at least the safety score of the one or more products within the smart container, the safety score of the new product and a machine learning model.

According to at least one embodiment, the present invention may improve product safety by displaying the recommended location for a new product to the user utilizing Augmented Reality (AR).

According to at least one embodiment, the present invention may improve product safety by identifying cross-contamination within a smart container using light properties, notifying the user of the cross-contamination within the smart container, and utilizing micro-fluidic platforms within the smart container to contain the cross-contamination.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a product program 110a. The networked computer environment 100 may also include a server 112 that is enabled to run a product safety program 110b that may interact with a database 114 and a communication network 116. The networked computer environment 100 may include a server 112 enabled to run a product safety program 110b that may interact with a personal database 122 and a communication network 116. The networked computer environment 100 may include a plurality of computers 102 and servers 112, only one of which is shown. The networked computer environment may include a smart container 118 and a connected device 120. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the product safety program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the product safety program 110a, 110b (respectively) to map one or more products within a smart container and determine a recommended location to store a new product within the smart container. The product safety method is explained in more detail below with respect to FIG. 2.

Figure 2:
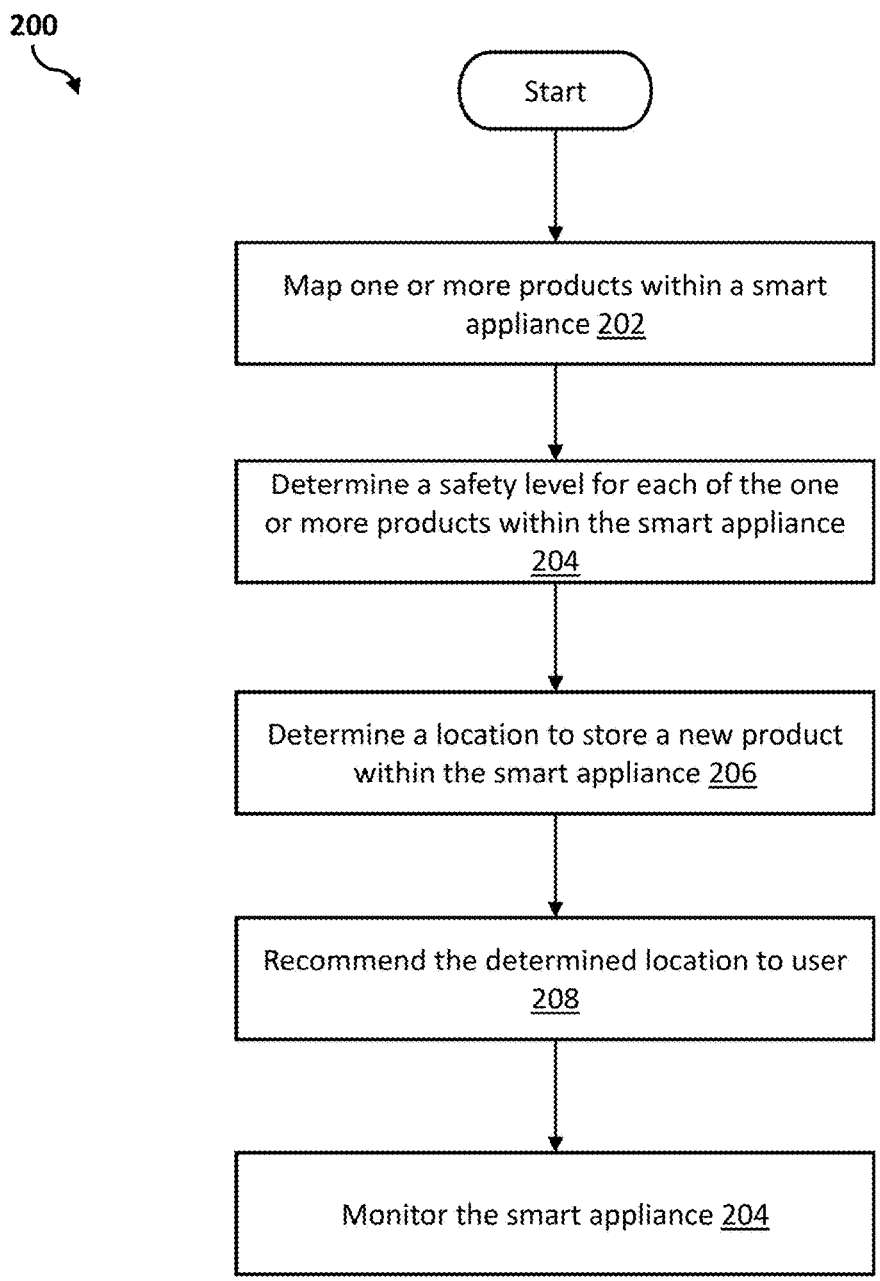
FIG. 2 is an operational flowchart illustrating a process for product according to at least one embodiment.

Referring now to FIG. 2, an operational flowchart illustrating the exemplary product safety process 200 used by the product safety program (hereinafter product safety program 110) according to at least one embodiment is depicted.

At 202, the product safety program 110 maps one or more products within a container. Mapping the one or more products in the container may include identifying the one or more products within the container and determining the location of the one or more products within the container. The container may be a smart container. The smart container may be, but is not limited to, an IoT (Internet of Things) refrigerator (e.g., smart refrigerator), IoT microwave (e.g., smart microwave), IoT oven (e.g., smart oven), container equipped with smart shelves (e.g., IoT shelves), IoT enabled appliance, shipping container, amongst other IoT enabled containers. The product safety program 110 may be installed on the smart container 118 or the smart container 118 may access the product safety program 110 though a downloadable application.

The smart container 118 may utilize a connected device 120 (e.g., camera 120, scanner 120, bar code scanner, RFID (Radio Frequency Identification) scanner, QR code scanner) in identifying the one or more products within the smart container 118 and determining the location of the one more products within the smart container 118.

The one or more products within the smart container 118 may include untagged products and tagged products. Tagged products may be affixed with a tag, such as, but not limited to, an RFID tag, barcode tag, QR (Quick Response) code tag, UPC (Universal Product Code) tag, 1D (1 Dimensional) barcodes, 2D (2 Dimensional) barcodes, different types of labels, amongst others. The tag may contain a variety of information with respect to the tagged product, such as, but not limited to, product type, identification numbers, recall status, product model, origin location, country of origin, date of manufacturing, name of manufacturer, price of the product, amongst other information. The product safety program 110 may utilize the scanner 120 connected to the smart container 118 to identify the tagged products.

In order to identify the tagged products, the product safety program 110 may utilize a connected knowledge corpus 114 (e.g., database 114). The product safety program 110 may utilize the tag scanned by the scanner 120 connected to the smart container 118 to search the knowledge corpus 114 based on the tag scanned of the tagged product. The knowledge corpus may be a pre-built searchable database comprised of at least, bar codes and their corresponding product and safety information for each product. Safety information may include incompatible products (e.g., products that should not be stored together).

Untagged products may not be affixed with a tag, information about an untagged product may be based on the state (i.e., underripe, ripe, overripe, expired), of the untagged product. However, the variety of information, described above, which may be available on the tag of a tagged product may not be available for untagged products. The product safety program 110 may utilize the camera 120 connected to the smart container 118 to identify the tagged products.

In order to identify the untagged products, the product safety program 110 may utilize the connected knowledge corpus 114 (e.g., database 114). The product safety program 110 may utilize the image captured by the camera 120 connected to the smart container 118 to search the knowledge corpus 114 based on the image captured of the untagged product. The knowledge corpus may be a pre-built searchable database comprised of at least, images of untagged products in different states (i.e., underripe, ripe, overripe, expired), expiration information based on the state of the untagged product (e.g., an overripe banana has approximately 3 days till expiration), as well as safety information for each product.

The product safety program 110 may utilize the connected device 120 of the smart container 118 to determine the location of the one or more products identified within the smart container 118. The product safety program 110 may generate a map of the one or products within the smart container which includes at least the type of product (e.g., identity of the product) and the location of the one or more products within the smart container 118.

The product safety program 110 may also receive data pertaining to the smart container 118 from a user. Data from the user may include, but is not limited to including, age of one or more users of the smart container 118, medical history of the one or more users of the smart container 118, medical history of the one or more users of the smart container 118, dietary preferences of the one or more users of the smart container 118, dietary restrictions of the one or more users of the smart container 118, whether the smart container 118 is being utilized for commercial or personal purposes, amongst other data.

The product safety program 110 may store the map generated of the smart container 118 and data from the user in both the knowledge corpus 114 (e.g., database) and a personal knowledge corpus 122 (e.g., personal database 122). The knowledge corpus 114 (e.g., database 114) may be utilized by the product safety program 110 to store the mappings generated for other users, which the product safety program 110 may utilize in determining a storage location for a new product, as detailed in Step 206 below.

At 204, the product safety program determines a safety level for each of the one or more products within the smart container. The product safety program 110 may determine the safety level for each of the one or more products within the smart container 118 based on at least the data gathered from the connected device 120 of the smart container 118, as described at Step 202. The product safety program 110 may continuously update the safety level for each of the one or more products based on at least, the amount of time a product has been stored within the smart container 118, additional images captured utilizing the connected device 120 of the smart container 118, data such as the expiration information from the knowledge corpus 114, amongst other data.

The product safety program 110 may update the safety level for tagged products based on an amount of time remaining before the expiration date. The product safety program 110 may update the safety level of untagged products by capturing additional images of the untagged product and comparing the image to similar product images stored in the knowledge corpus 114 (e.g., database).

The product safety program 110 may utilize the safety level determined for each of the one or more products to determine a safety confidence score. The safety confidence score may represent the safety of storing the one or more products in various combinations. The product safety program 110 may utilize a machine learning model (described in more detail below) in determining the safety confidence score of storing the one or more products in various combinations. The safety confidence score may continuously update as the safety level for each of the one or more products is updated and the machine learning model is provided more data. The machine learning model may be provided more data as the product safety program 110 stores more mappings of smart containers 118 from one or more users.

The product safety program 110 may utilize association rule learning. Association rule learning may be a rule-based machine learning method for determining relations between variables in large databases. In the present invention, the product safety program, utilizing the association rule learning algorithm, may use one or more mappings stored in the knowledge corpus as the database for determining relations between variables. For example, the machine learning model based on the one or more mappings stored in the knowledge corpus may determine there is a relationship between cheese, milk, and yogurt because those food products are frequently stored together. The product safety program 110 may increase the safety confidence score with respect to the combinations cheese and milk, cheese and yogurt, and milk and yogurt.

The product safety program 110 may utilize a machine learning recommendation algorithm, such as, but not limited to, collaborative filtering. Collaborative filtering may be a process of filtering information or patterns using techniques involving collaboration among multiple agents, viewpoints, data sources, etc. For example, here, the product safety program 110 may filter data stored in the knowledge corpus based on similar data received from users, such as user's who share an allergy. There may be data from X number of smart containers for user's who share a particular allergy. The data may show that Food Item A is frequently located next to Food Item B but never placed with Food Item C. Comparatively, there may be data from Y number of smart containers for users who do not share the allergy. This data may show that Food Item A, Food Item B, and Food Item C are frequently located next to one another. The product safety program 110 may determine based on this relationship that for users who share this particular allergy it is unsafe to store Food Item C close to Food Item A. The product safety program 110 may accordingly reduce the safety confidence score for the combination of Food Item C and Food Item A for users who share the particular allergy.

The product safety program 110 may determine the safety confidence score based on the safety level of the product and the machine learning model. The product safety program 110 may update the safety confidence score as more data is stored in the knowledge corpus (e.g., database), the user inputs data, and as the safety level for each of the one or more products is updated. The safety confidence score may be a numerical value (e.g., 1 is safe and 0 is unsafe) with the safety confidence score falling within a range.

At 206, the product safety program determines a recommended location to store a new product within the smart container. As described above in Step 202, the product safety program 110 may utilize the connected device 120 of the smart container 118 to identify the new product and collect additional data (e.g., country of origin, expiration date, recall status, presence of mold) on the new product by searching the knowledge corpus 114 (e.g., database). As described in Step 204, the product safety program 110 may determine the safety level of the new product.

The product safety program 110 may utilize the safety score and the machine learning model to determine the safety confidence score for the new product in combination with the one or more products. The product safety program 110 may determine the location within the smart container 118 to safely store the new product based on the highest safety confidence score. The product safety program 110 may recommend the user rearrange the one or more products to provide the highest safety confidence score between all products (e.g., the new product and the one or more products).

For example, a user may be trying to store a new product within the smart container 118. The product safety program may utilize the connected scanner 120 of the smart container 118 to scan the barcode of the new product. The new product may be yogurt. The yogurt may be far from its expiration date and the safety information retrieved from the knowledge corpus may indicate this yogurt is rarely the cause of cross-contamination, the product safety program 110 may accordingly assign a high safety level to the yogurt. The product safety program may utilize the determined safety level for the yogurt and the machine learning model to determine that the highest safety confidence score with respect to the yogurt is to be stored in combination with the cheese and milk already stored within the smart container.

At 208, the product safety program displays the recommended location for the new product to a user. The product safety program 110 may display the recommended location for the new product to the user utilizing a digital display. The product safety program 110 may utilize Augmented Reality (AR) in providing the visual display to the user. The AR display may display to the user the recommended location, as well as the safety level of the new product, the safety confidence score as the user places the product within the smart container, amongst other information and recommendations for the new product. Other information and recommendations with respect to the new product may include at least recommended handling of the product and sanitation reminders. The AR display may be presented to the user through an IoT (Internet of Things) device, such as, the camera of a smartphone or smart glasses.

The product safety program 110 may utilize a screen connected to the smart container 118 in displaying the recommended location for the new product to the user. The product safety program 110 may also utilize one or more lights within the smart container to display the recommended location for the new product to the user.

Continuing with the above example, the product safety program may display the recommended location for the yogurt to the user using augmented reality. The user may see the recommended location with the highest safety confidence score through their smart glasses. The smart glasses may display the safety level of the yogurt as well as the safety levels of the one or more other products within the smart container 118. The user may receive a warning or other notification if the user tries to place the yogurt in a location other than the determined location. The user may place the yogurt next to the milk and cheese at the determined location At 210, the product safety program monitors the smart container. The product safety program 110 may monitor the smart container 118 by identifying cross-contamination between the one or more products within the smart container 118. The product safety program 110 may identify cross-contamination within the smart container 118 by using light properties (e.g., diffraction and interference). The product safety program 110 may periodically use light to pass through the smart container 118 and based on the determined location of the products within the smart container a spill may be determined based on an aberration. The product safety program 110 may determine based on the level of aberration and the product in which the aberration is around whether the spill is water, fluid, or some other substance.

The product safety program 110 may store cross-contamination data in the personal knowledge corpus and knowledge corpus as well as train the machine learning model based on the cross-contamination data. The product safety program 110 may send a notification to the user of the cross-contamination. The notification may include data such as, the affected products, an updated safety level of the affected products, and remediation techniques.

The product safety program 110 may utilize microfluidic platforms within the smart container to contain the cross-contamination. The product safety program 110 may determine based on the aberration of the light and the surrounding one or more products that cross-contamination is likely. The product safety program 110 may utilize the microfluidic platforms to raise the area around the liquid to restrict the flow of liquid into other areas.

The product safety program 110 may monitor the safety levels of the products within the smart container 118 and make recommendations based on the products within the smart container 118. For example, the product safety program may notify a user that a product within the smart container 118 is approximately two days from being inedible or unsafe. The product safety program 110 may recommend recipes for the product based on the other products within the smart container 118 and data entered by the user stored in the personal knowledge corpus.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
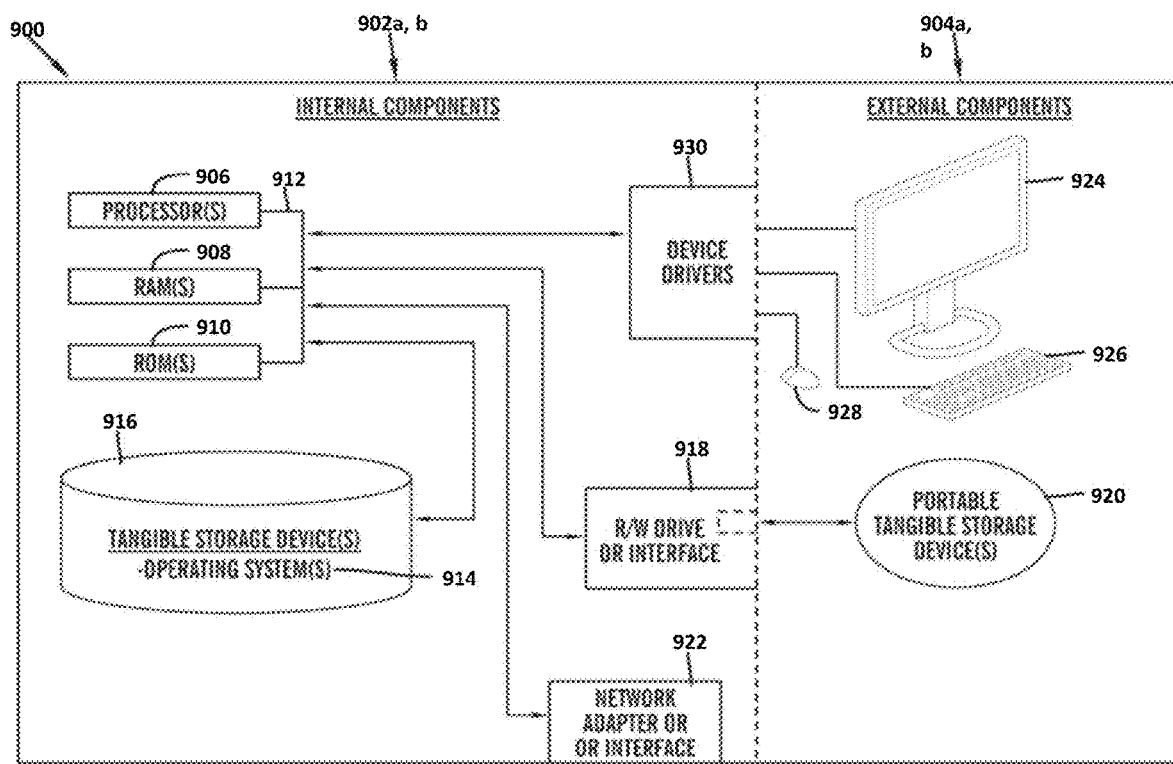
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the product safety program 110*a* in client computer 102, and the product safety program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the product safety program 110*a* and 110*b* can be stored on one or more of the respective portable computer-readable tangible storage devices 920, read via the respective RAY drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the product safety program 110*a* in client computer 102 and the product safety program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the product safety program 110*a* in client computer 102 and the product safety program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
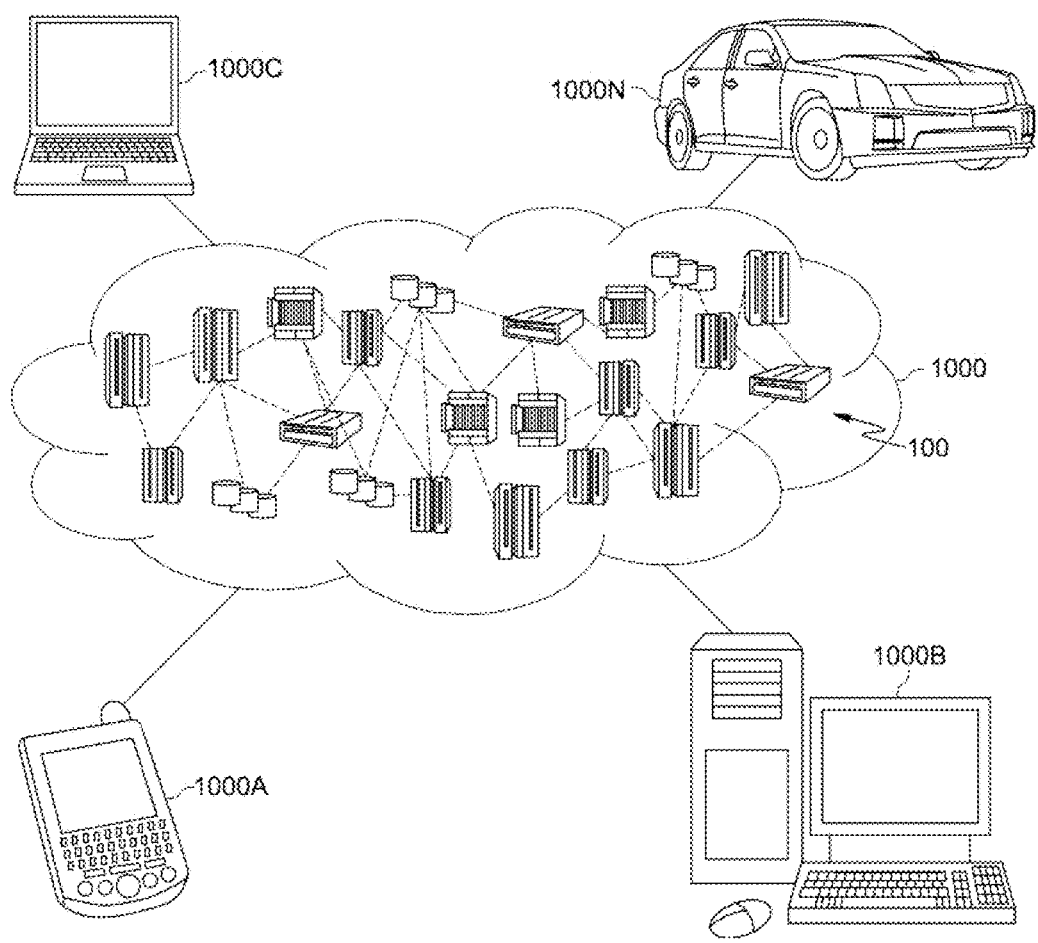
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
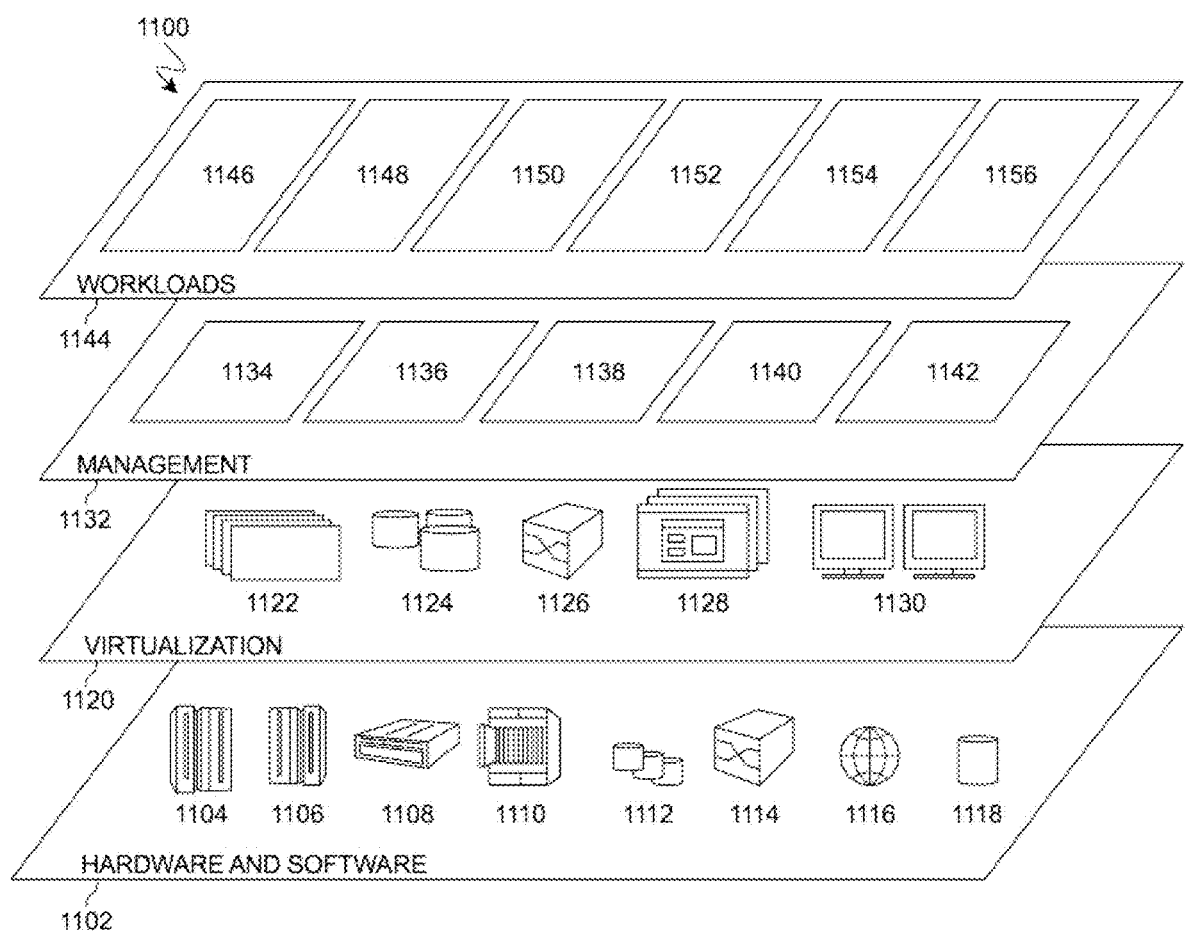
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and product safety 1156. A product safety program 110a, 110b provides a way to determine a recommended location to store a new product within a smart container and display the recommended location to a user.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for product safety, the method comprising:
mapping one or more products within a smart container by identifying each of the one or more products and determining a location for each of the one or more products, wherein the one or more products may be comprised of tagged products and untagged products;
determining a safety level for each of the one or more products, wherein a safety level of untagged products is determined based on a state of each untagged product derived from one or more images, and wherein a safety level of tagged products is determined based on an expiration date of each tagged product;
determining a recommended location to store a new product within the smart container based on a safety confidence score, wherein the safety confidence score is determined based on at least the safety score of the one or more products within the smart container, the safety score of the new product, and a machine learning model; and
displaying the recommended location for the new product to a user using an Augmented Reality display, wherein the Augmented Reality display includes at least the safety level of the new product and the safety confidence score of the recommended location.

2. The method of claim 1, further comprising:
updating the safety level for the untagged products by capturing additional images of the untagged product and searching a knowledge corpus based on the additional images, wherein the knowledge corpus is comprised of images of untagged products in a plurality of different states; and
updating the safety level for the tagged products based on an amount of time remaining before an expiration date.

3. The method of claim 1, further comprising:
identifying cross-contamination within the smart container using light properties;
notifying the user of the cross-contamination within the smart container; and
utilizing microfluidic platforms within the smart container to contain the cross-contamination;
storing cross-contamination data in a personal knowledge corpus; and
retraining the machine learning model based on the cross-contamination data.

4. A computer system for product safety, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:

mapping one or more products within a smart container by identifying each of the one or more products and determining a location for each of the one or more products, wherein the one or more products may be comprised of tagged products and untagged products;

determining a safety level for each of the one or more products, wherein a safety level of untagged products is determined based on a state of each untagged product derived from one or more images, and wherein a safety level of tagged products is determined based on an expiration date of each tagged product;

determining a recommended location to store a new product within the smart container based on a safety confidence score, wherein the safety confidence score is determined based on at least the safety score of the one or more products within the smart container, the safety score of the new product, and a machine learning model; and displaying the recommended location for the new product to a user using an Augmented Reality display, wherein the Augmented Reality display includes at least the safety level of the new product and the safety confidence score of the recommended location.

5. The computer system of claim 4, further comprising:

updating the safety level for the untagged products by capturing additional images of the untagged product and searching a knowledge corpus based on the additional images, wherein the knowledge corpus is comprised of images of untagged products in a plurality of different states; and updating the safety level for the tagged products based on an amount of time remaining before an expiration date.

6. The computer system of claim 4, further comprising:

identifying cross-contamination within the smart container using light properties;

notifying the user of the cross-contamination within the smart container; and utilizing microfluidic platforms within the smart container to contain the cross-contamination;

storing cross-contamination data in a personal knowledge corpus; and retraining the machine learning model based on the cross-contamination data.

7. A computer program product for product safety, comprising:

one or more non-transitory computer-readable storage media and program instructions stored on at least one of the one or more tangible storage media, the program instructions executable by a processor to cause the processor to perform a method comprising:

mapping one or more products within a smart container by identifying each of the one or more products and determining a location for each of the one or more products, wherein the one or more products may be comprised of tagged products and untagged products;

determining a safety level for each of the one or more products, wherein a safety level of untagged products is determined based on a state of each untagged product derived from one or more images, and wherein a safety level of tagged products is determined based on an expiration date of each tagged product;

determining a recommended location to store a new product within the smart container based on a safety confidence score, wherein the safety confidence score is determined based on at least the safety score of the one or more products within the smart container, the safety score of the new product, and a machine learning model; and displaying the recommended location for the new product to a user using an Augmented Reality display, wherein the Augmented Reality display includes at least the safety level of the new product and the safety confidence score of the recommended location.

8. The computer program product of claim 7, further comprising:

updating the safety level for the untagged products by capturing additional images of the untagged product and searching a knowledge corpus based on the additional images, wherein the knowledge corpus is comprised of images of untagged products in a plurality of different states; and updating the safety level for the tagged products based on an amount of time remaining before an expiration date.

9. The computer program product of claim 7, further comprising:

identifying cross-contamination within the smart container using light properties;

notifying the user of the cross-contamination within the smart container;

utilizing microfluidic platforms within the smart container to contain the cross-contamination;

storing cross-contamination data in a personal knowledge corpus; and retraining the machine learning model based on the cross-contamination data.

10. The method of claim 1, further comprising:

monitoring the one or more products within the smart container by periodically using light to pass through the smart container;

identifying one or more aberrations around at least a portion of the one or more products within the smart container; and determining a likelihood of cross-contamination based on a level of the one or more aberrations.

11. The computer system of claim 4, further comprising:

monitoring the one or more products within the smart container by periodically using light to pass through the smart container;

identifying one or more aberrations around at least a portion of the one or more products within the smart container; and determining a likelihood of cross-contamination based on a level of the one or more aberrations.

12. The computer program product of claim 7, further comprising:

monitoring the one or more products within the smart container by periodically using light to pass through the smart container;

identifying one or more aberrations around at least a portion of the one or more products within the smart container; and determining a likelihood of cross-contamination based on a level of the one or more aberrations.

13. The method of claim 1, further comprising:

receiving additional data from one or more other users, wherein the additional data received from the one or more other users includes at least one or more mappings of other smart containers; and updating the safety level for each of the one or more products based on an output of the machine learning model wherein an input is the additional data received.

14. The method of claim 1, wherein the machine learning model utilizes collaborative filtering techniques in determining the recommended location to store the new product.

15. The method of claim 2, further comprising:
updating the safety confidence score based on an updated safety level for the untagged products or an updated safety level for the tagged products.

16. The method of claim 10, further comprising:
sending a notification to the user of a likely cross-contamination based the level of at least one of the one or more aberrations, wherein the notification includes at least one or more of a list of affected products, an updated safety level of the affected products, and one or more remediation techniques.

17. The method of claim 3, wherein the microfluid platforms of the smart container are utilized to raise an area around a liquid to restrict a flow of the liquid into other areas of the smart container.

18. The method of claim 1, further comprising:
monitoring the safety level for each of the one or more products within the smart container;
determining the safety level for at least one product is approaching inedible or unsafe levels;
sending a notification to the user, wherein the notification includes one or more recommendations.

19. The method of claim 18, wherein the one or more recommendations includes at least one or more recipes which include the at least one product approaching the inedible or the unsafe levels and one or more other products within the smart container.

\* \* \* \* \*